US010823756B2

(12) United States Patent
Loparic

(10) Patent No.: US 10,823,756 B2
(45) Date of Patent: Nov. 3, 2020

(54) SAMPLE HOLDER FOR HOLDING A SAMPLE FOR USE WITH AN ATOMIC FORCE MICROSCOPE

(71) Applicant: UNIVERSITÄT BASEL, Basel (CH)

(72) Inventor: Marko Loparic, Basel (CH)

(73) Assignee: UNIVERSITÄT BASEL, Basel (CH)

( * ) Notice: Subject to any disclaimer, the term of this patent is extended or adjusted under 35 U.S.C. 154(b) by 0 days.

(21) Appl. No.: 14/910,704

(22) PCT Filed: Aug. 6, 2014

(86) PCT No.: PCT/EP2014/066904
§ 371 (c)(1),
(2) Date: Feb. 8, 2016

(87) PCT Pub. No.: WO2015/018865
PCT Pub. Date: Feb. 12, 2015

(65) Prior Publication Data
US 2016/0178658 A1 Jun. 23, 2016

(30) Foreign Application Priority Data
Aug. 6, 2013 (EP) .................................... 13179454

(51) Int. Cl.
G01Q 30/20 (2010.01)
(52) U.S. Cl.
CPC ..................... G01Q 30/20 (2013.01)
(58) Field of Classification Search
CPC ......... H01J 37/20; G01Q 30/20; B82Y 35/00; B25J 1/00
See application file for complete search history.

(56) References Cited

U.S. PATENT DOCUMENTS 4,020,846 A * 5/1977 Stokes .................. A61B 17/30
294/99.2
4,672,797 A 6/1987 Hagler
(Continued)

FOREIGN PATENT DOCUMENTS

CN 201814628 5/2011
CN 202495417 10/2012
(Continued)

OTHER PUBLICATIONS

Marko Loparic et al, "Micro- and Nanomechanical Analysis of Articular Cartilage by Indentation-Type Atomic Force Microscopy Validation with a Gel-Microfiber Composite", Biophysical Journal vol. 98, Jun. 2010. 2731-2740, Denis Wirtz.
(Continued)

Primary Examiner — Brooke Purinton
(74) Attorney, Agent, or Firm — Soroker Agmon Nordman

(57) ABSTRACT

The invention relates to a sample holder (1) for holding a sample, particularly for use with an atomic force microscope. According to the invention, the sample holder (1) comprises: preferably a flexible support (10) having an upper side (10a) and a lower side (10b) facing away from said upper side (10a), a first and a second holding member (100, 200), wherein each holding member (100, 200) comprises a first section (101, 201) that is preferably connected to the upper side (10a) of the flexible support (10), as well as an opposing second section (102, 202) forming a tip (103, 203) of the respective holding member (100, 200), such that the holding members (100, 200) are each movable from a first position, in which the tips (103, 203) are positioned adjacent to one another, into a second position, in which the tips (103, 203) are further apart from each other than in said first positions and are separated by a gap (G) for receiving at least a portion of the sample (S) to be held, and wherein
(Continued)

said tips (103, 203) are designed to penetrate the sample (S) or to press against it so as to hold it when the sample (S) is received by said gap (G) and the holding members (100, 200) are moved back from the second positions into the first positions.

18 Claims, 7 Drawing Sheets

(56) References Cited

U.S. PATENT DOCUMENTS

| | | | | |
|---|---|---|---|---|
| 5,041,783 | A | * | 8/1991 | Ohta ..................... G01Q 60/16 324/96 |
| 5,229,607 | A | | 7/1993 | Matsui |
| 5,607,449 | A | * | 3/1997 | Tontarra ................. A61B 17/29 606/205 |
| 6,057,546 | A | | 5/2000 | Braunstein |
| 6,158,559 | A | * | 12/2000 | Asa ......................... F16C 29/02 188/322.17 |
| 2002/0131167 | A1 | | 9/2002 | Nguyen |
| 2005/0196857 | A1 | * | 9/2005 | Lee ........................ G02B 21/34 435/292.1 |
| 2009/0102214 | A1 | * | 4/2009 | Cho ........................ B25B 9/02 294/99.2 |
| 2011/0121592 | A1 | * | 5/2011 | Cho ........................ A61B 17/30 294/99.2 |
| 2011/0123951 | A1 | * | 5/2011 | Lomicka .............. A61C 8/0012 433/174 |
| 2011/0227566 | A1 | * | 9/2011 | Hsieh ...................... B82Y 35/00 324/244 |
| 2013/0345743 | A1 | * | 12/2013 | Aue .................... A61B 17/2909 606/205 |
| 2015/0068759 | A1 | * | 3/2015 | Harbison ............... E21B 17/012 166/350 |

FOREIGN PATENT DOCUMENTS

| | | |
|---|---|---|
| JP | 3039562 B2 | 7/1992 |
| JP | 2000214064 | 8/2000 |
| JP | 2002543440 | 12/2002 |
| JP | 2007205964 | 8/2007 |
| WO | WO 9838501 A1 | 9/1988 |
| WO | 03/087018 | 10/2003 |
| WO | 2008/089950 | 7/2008 |

OTHER PUBLICATIONS

Marija Plodinec, Marko Loparic and Ueli Aebi, "Atomic force Microscopy (AFM) for biological imaging and mechanical testing across length scales".Chapter 2, p. 69-93, Switzerland, Cold Spring Harbor Protocols Oct. 2010 (2010).

A Iykovic, A Pascher et al, "Articular cartilage repair by genetically modified bone marrow aspirate in sheep".Gene Therapy (2010) 17, 779-789.

Marija Plodinec, Marko Loparic et al,"The nanomechanical signature of breast cancer".Nature Nanotechnology, Published Online: Oct. 21, 2012, 757-765.

Martin Stolz, Riccardo Gottardi et al,"Early detection of aging cartilage and osteoarthritis in mice and patient samples using atomic force microscopy".Nature Nanotechnology,Published Online: Feb. 1, 2009.

Eric M. Darling, Rebecca E. Wilusz et al, "Spatial Mapping of the Biomechanical Properties of the Pericellular Matrix of Articular Cartilage Measured In Situ via Atomic Force Microscopy". Biophysical Journal ,vol. 98 ,Jun. 2010 2848-2856.

* cited by examiner

SAMPLE HOLDER FOR HOLDING A SAMPLE FOR USE WITH AN ATOMIC FORCE MICROSCOPE

The present application claims priority as a US national phase under 35 U.S.C. 363 of PCT/EP2014/066904 filed on Aug. 6, 2014, the disclosure of which is incorporated herein by reference. Additionally, PCT/EP2014/066904 claims priority from EP 13179454.7 dated Aug. 6, 2013.

The invention relates to a sample holder for holding a sample, particularly for use with an atomic force microscope, a corresponding system, as well as a method for holding such a sample.

Atomic Force Microscopy (AFM) is today recognized as a very promising and important tool for exploring in vivo and/or in vitro of variety of biological processes and pathologies [1-5]. However, working with living biological tissues requires specific experimental settings to ensure their viability and consequently accurate and reproducible measurements. These settings include a fast and easy sample transfer from the extraction site to the AFM, a firm and easy sample attachment, as well as near physiological experimental conditions (gas, temperature and perfusion). Until now, most of the work was done in improving the experimental conditions as much as possible to the physiological environment. Presently, samples are often transferred in the provisional tubes or boxes to the labs and then attached with the glue. However, there are several problems, as outlined below.

Biological samples are usually very soft and quite small if extracted from the biopsy tool. If the sample is afterwards transferred to the provisional tube/box, this increases the chance of damaging the sample since it is not attached and is freely floating which complicates further handling and increases the risk of damage when the sample is positioned and removed for the attachment under the microscope.

Further, particularly, a biological sample needs to be immersed continuously in the appropriate buffer solution to maintain its physiological functions. Unfortunately, most of the employed glues (e.g. Epoxy, Tissue Glue) do not perform properly in liquid environment. Consequently, biological samples often need to be partially dried which could significantly alter their properties. Moreover, mixing of the glue with the sample buffer could potentially contaminate the sample.

Significant improvements and upgrades for the sample mounting under an AFM have been made over the last decade. For examples, there is variety of convenient solutions offered for AFM experiments on cells. Typically, cells are attached to the bottom of a tissue culture dish which is then stabilized on the AFM sample stage. In addition, temperature, gas and perfusion control is provided.

However, on the other hand, little has been done on improving the attachment, hydration and positing of larger intact tissues under the AFM. Current protocols are limited to variety of different gluing procedures on either hydrophobic (PTFE) supports or tissue culture dishes.

Based on the above, the problem underlying the present invention is to provide for a sample holder that allows for a firm attachment and preferably an easy and fast transfer of (e.g. living biological) samples, particularly under the AFM.

This problem is solved by a sample holder having the features of claim 1.

Preferred embodiments are also stated in the corresponding sub claims.

According to claim 1, the sample holder comprises at least a first and a second holding member, wherein each holding member comprises a a tip, such that the holding members are each movable from a first position, in which the tips are positioned adjacent to one another (but can be separated by a small gap), into a second position, in which the tips are further apart from each other than in said first positions and are separated by a (then larger) gap for receiving at least a portion of the sample to be held, and wherein said tips are designed to penetrate the sample or at least to press against the sample so as to hold it, when the sample is received by said gap and the holding members are moved back from the second positions into the first positions.

Preferably, the sample holder comprises a flexible support having an upper side and a lower side facing away from said upper side, wherein each holding member comprises a first section that is connected, particularly glued, to the upper side of the flexible support, as well as a second section forming said tip.

The sample holder according to the invention is particularly suited for soft biological samples (breast, skin tissue), particularly extracted with medical biopsy tools (e.g. SENORX EnCor Mammo Biopsie System, Siemens, Germany). As described, the samples are positioned in the middle of the gap or groove and firmly attached by the afore-described mechanism. This particularly allows for measurements of segments of the sample which are usually not accessible to measurements, since—when glue is used—the waviness of the sample surface is usually increased due to the fact that it is rather difficult to make a flat glue deposit on which the sample is to be placed.

Particularly, the sample holder according to the invention uses a glue-free, mechanical stabilization of the sample to avoid potential glue contamination of the sample (either because of a mixing of the glue with the sample or the surrounding buffer solution). Moreover, said mechanical stabilization particularly provides for the possibility to use the same sample after the AFM experiment for further analysis since the composition and structure of the sample is not significantly affected as would be the case when using glue for fixation of the sample. Particularly, mechanical stabilization also means that less time is needed in the pre-experimental phase, since there is no need to wait for the glue to cure.

Particularly, according to a preferred embodiment of the present invention, said movement from the first positions into the second positions comprises a pivoting movement of the holding members upon which the tips move away from each other. Particularly, said holding members oppose each other and are designed to be pivoted out of their first positions towards the second positions at the same time.

However, alternatively, it is also possible that said movement is a linear movement, where the tips are simply displaced away from each other (or towards one another). In this case, the flexible support may be elastic or may be replaced by some other means allowing for such a linear movement.

Particularly, the device comprises a base, wherein said flexible support is designed to rest with its lower side on an upper side of said base. In a preferred embodiment of the present invention, the base is particularly designed to act with a magnetic force on the holding members, respectively, so as to attract them. For this, the base may comprise one or several magnetic regions, e.g. in the form of one or several magnets, which may be integrated into the base. Further, the base itself may be formed as a magnet.

The base is preferably designed to be mounted on an AFM sample stage, which may be formed as a steel plate, for instance.

Preferably, the first and the second holding member fall in line with respect to each other in said first position (i.e. their longitudinal axes in case of elongated holding members or their planes of extension in case of plate-like, net-like or mesh-like holding members coincide). Preferably, the first and second holding member are arranged at an (particularly obtuse) angle, particularly smaller than 180°, with respect to each other in said second position (resulting in said enlarged gap between the tips). To fall in line means that the elongated members are aligned with respect to each other (i.e. so that their longitudinal axes or planes of extension coincide) so that they ideally enclose an angle of 180°. However, in particular, there may be small deviations from this angle, but only to the extent that the gap between the tips is still larger in the second position than in the first position of the elongated members.

Particularly, the flexible support comprises PTFE or is formed out of PTFE. Preferably, the flexible support is formed as a PTFE tape. The support can be made as long as necessary, wherein said boundary regions preferably extend parallel to each other along an (e.g. longitudinal) extension direction of the support (along which said tape or support has the variable length).

In a preferred embodiment of the invention, the center part of the flexible support extending along the gap comprises a thin porous structure or surface, particularly having a width of 3 mm, which is particularly formed by an e.g. metallic or polymer foam or a similar porous structure, wherein these foams or structures are preferably coated with polylysine or fibrin, in order to increase the contact area and adhesion with the sample. When the sample is lifted, i.e., when the holding members reside in their second positions said pores are open, and once the holding members are moved to the first positions, said pores close, so that the sample can be also catched by the pores in addition.

Particularly, the first section of each holding member is fastened or glued to the upper side of the flexible support, particularly by means of a glue, particularly comprising epoxy.

According to a preferred variant of the invention, the holding members each comprise a hydrophobic surface, wherein said hydrophobic surface is at least formed on an outer side of each holding or elongated member facing away from the flexible support, wherein particularly said hydrophobic surfaces are formed by coating said outer sides with a hydrophobic coating, particularly with a hydrophobic PAP-Pen marker, PTFE, or some hydrophic polymer etc.

In a preferred variant of the invention, the sample holder comprises a separate first base segment, which can be formed out of a metal or comprises a metal, and which is particularly connected to the upper side of the flexible support adjacent to said first section of the first holding member and attracted by the base (due to a magnetic force exerted by the base and acting on the first base segment), so that said first base segment is spaced apart from the first section of the first holding member and when the first holding member is in its first position—aligned with the first holding member along the longitudinal axis or plane of extension of the first holding member (i.e. the first base segment and the first holding member fall in line in said first position). Thus, due to the distance between said first base segment and said first holding member, the latter can be pivoted out of its first position into its second position. Upon this pivoting movement, the first holding member is particularly released from the base that attracts the first holding member (although separated from the first holding member by the flexible support) and particularly takes along a portion of the flexible support to which it is connected, while the first base segment particularly remains attached to the magnetic base (under interposition of the flexible support), but particularly slides along the magnetic base when the first holding member is moved into its second position.

Likewise, the sample holder preferably further comprises a separate second base segment, particularly formed out of a metal or comprising a metal, which is connected to the upper side of the flexible support adjacent to said first section of the second holding member and attracted by the base (e.g. due to a magnetic force), and is particularly aligned with the second holding member (see above) in the first position of the second holding member. Thus, again, due to a distance between said second base segment and said second holding member, the latter can be pivoted out of its first position into its second position, wherein the second holding member is particularly released from the magnetic base that attracts the second holding member as well, and particularly takes along a portion of the flexible support connected to said second holding member, while the second base segment remains attached to the magnetic base (again under interposition of the flexible support). Upon pivoting the second base segment particularly slides along the magnetic base, particularly towards the first base segment.

Preferably, the first base segment is arranged on a first boundary region of the flexible support, while the second base segment is arranged on a second boundary region of the flexible support, which second boundary region opposes said first boundary region, and wherein particularly in the first position the first holding member is aligned with the first base segment (with respect to the longitudinal axis or plane of extension of the first holding member), and wherein particularly in the first position the second holding member is aligned with the second base segment (with respect to the longitudinal axis of the second holding member). Particularly, the first and the second holding member are arranged adjacent to one another and between the first and the second base segment. Further, preferably, the first and second base segment are glued to the flexible support, e.g. by means of a glue, e.g. comprising epoxy.

According to a variant of the invention, said holding members are designed to be moved from said first position into said second position (preferably at the same time) by insertion of a rod between said flexible support and said magnetic base below said tips and in a insertion direction running across the longitudinal axes of the holding members or along said gap. For easy insertion, said rod particularly comprises a tapered end region.

In a preferred embodiment of the present invention said holding members are formed as elongated holding members, i.e., they extend along a longitudinal axis and comprise a length along the longitudinal axis that is significantly larger than the dimensions of the individual holding member perpendicular to the respective longitudinal axis.

In a preferred embodiment of the present invention, in case of such elongated members, each elongated member comprises a bar, particularly formed out of a metal, which bar comprises the respective first section, and wherein particularly each elongated member further comprises a spike, particularly out of a steel connected to the respective bar, which spike comprises the respective second end section forming the respective tip. Particularly, the respective spike is glued to its associated bar, particularly by means of a glue, particularly comprising epoxy.

Alternatively, instead of elongated holding members, the first and the second holding member each comprise a net (or mesh) element or are formed by such a net (or mesh)

element that extends two-dimensionally along a plane of extension, i.e., parallel to the flexible support (at least in the first positions of the holding members). The width of the net elements perpendicular to said plane of extension is significantly smaller than the dimensions of the net elements in the respective plane of extension. These net elements comprise at least one tip forming said tip of the respective holding member. Preferably, each net element comprises a plurality of tips. Preferably, these tips result, when the respective net element is cut out of a larger net layer. The net element may be out of plastic or a metal. In case plastic net elements are used, the respective holding member may comprise an end or end region opposing the at least one tip, which end or end region is formed out of a suitable metal or comprises a suitable metal so that the respective end or end region can be attracted by the base by means of magnetic forces.

According to yet another preferred embodiment of the present invention the base comprises a rotatable member that is designed to be rotated between a first position corresponding to a retracted position and a second position corresponding to an advanced position of the rotatable member. Particularly, the rotatable member protrudes with a portion from the upper side of the base (e.g. normal to said upper side of the base) when arranged in its second position, wherein it rests with said portion against a lower side of the flexible support facing away from said upper side of the flexible support such that the holding members are arranged in their second positions when the rotatable member is arranged in its second position. Particularly, the rotatable member is essentially flush with said upper side of the base when arranged in its first position such that the holding members are correspondingly arranged in their first positions.

The rotatable member may comprise a handle for manually rotating the rotatable member about a rotation axis running perpendicular to the longitudinal axes of the holding members. Said handle preferably extends from the rotatable member and from the base along said rotation axis (particularly, the rotation axis forms a longitudinal axis of the handle).

Furthermore, preferably, each holding member comprises an end or end region opposing the tip of the respective holding member, wherein said base is designed to act with a magnetic force on each end or end region, so that said ends are attracted by the base, particularly so that said ends remain in contact with the base when the holding members are moved from their first positions into their second positions. In order to provide for a direct contact between the ends and the base, the end of the first holding member particularly protrudes beyond a first boundary region of the flexible support, and the end of the second holding member particularly protrudes beyond a second boundary region of the flexible support as well, which second boundary region particularly opposes the first boundary region. Preferably, the base comprises a first magnetic region or a first magnet for attracting and contacting the end or end region of the first holding member (or a plurality of ends/end regions in case of several first elongated holding members), as well as a second magnetic region or second magnet for attracting and contacting the end or end region of the second holding member (or a plurality of ends in case of several second elongated holding members).

Furthermore, said rotatable member preferably comprises a magnetic portion, e.g. in the form of a third magnetic region or magnet, e.g. integrated into the rotatable member, which magnetic portion faces said tips of the holding members in the first position of the rotatable member, so as to attract particularly at least two opposing tips (or even more opposing tips) of the holding members when the rotatable member and the holding members reside in their respective first position.

Preferably, the sample holder according to the invention comprises a plurality of first elongated holding members and a plurality of second elongated holding members, wherein particularly a second elongated holding member is associated to each first elongated holding member. In this case the sample holder particularly comprises: a flexible support having an upper side and a lower side facing away from said upper side, a plurality of first and a plurality of second elongated holding members, wherein a different second elongated holding member is associated to each first elongated holding member (or vice versa), wherein each elongated holding member comprises a first section that is connected to the upper side of the flexible support, as well as an opposing second section forming a tip of the respective elongated holding member, such that the elongated holding members are each movable from a first position, in which the tips are positioned adjacent to one another, into a second position, in which the tips are further apart from each other than in said first positions and are separated by a gap for receiving at least a portion of the sample to be held, and wherein said tips are designed to penetrate the sample so as to hold it when the sample is received by said gap and the elongated holding members are moved back from the second positions into the first positions.

Preferably, the first elongated holding members extend parallel with respect to each other, are particularly equidistantly spaced apart from each other, and are arranged on a first region of the flexible support, while the second elongated holding members extend parallel with respect to each other, are particularly equidistantly spaced apart from each other, and are arranged on a second region of the flexible support, which second region opposes the first region along the longitudinal axes of the elongated members.

Preferably, the sample holder further comprises a plurality of separate first base segments, particularly formed out of a metal or comprising a metal, which first base segments are connected to the upper side of the flexible support, and are attracted by the magnetic base, wherein each first base segment is associated to a different first elongated holding member and is arranged adjacent to the first section of the associated first elongated holding member (see above) so that the first elongated holding members can be pivoted out of their first positions into their second positions, wherein the first elongated holding members are released from the magnetic base and particularly take along a portion of the flexible support to which they are connected, while the first base segments remain attached to the magnetic base (although they particularly slide along the magnetic base upon pivoting of the first elongated holding member). Further, the sample holder preferably comprises a plurality of separate second base segments, particularly formed out of a metal or comprising a metal, which second base segments are connected to the upper side of the flexible support, and are attracted by the magnetic base, wherein each second base segment is associated to a different second elongated holding member and is arranged adjacent to the first section of the associated second elongated holding member (see above) so that the second elongated holding members can be pivoted out of their first positions into their second positions, wherein the second elongated holding members are released from the magnetic base and particularly take along a portion of the flexible support to which they are connected, while the second base segments remain attached to the magnetic base (although they particularly slide along the magnetic base upon pivoting of the second holding member).

Preferably, the first base segments are arranged on a first boundary region of the (first region of the) flexible support, wherein the second base segments are preferably arranged on a second boundary region of the (second region of the) flexible support, which second boundary region opposes said first boundary region (see above). Particularly, in the first positions, each first elongated holding member is aligned with its associated first base segment, while each second elongated holding member is aligned with its associated second base segment. Further, preferably, each elongated first holding member is arranged adjacent to its associated second elongated holding member, and these elongated holding members are preferably arranged between their associated first and the second base segments. Particularly, the first and second base segments are glued to the upper side of the flexible support, particularly by means of a glue, particularly comprising epoxy (see also above).

Further, preferably, in case a plurality of first and a plurality of second elongated holding members is present, each first elongated holding member and its associated second elongated holding member fall in line with respect to each other in said first position (i.e. with respect to their longitudinal axes, which then coincide), whereas they are arranged at an (e.g. obtuse) angle, particularly smaller than 180°, with respect to each other in said second positions.

Again, in case a plurality of first and a plurality of second elongated holding members is present, the elongated holding members are preferably designed to be moved from the first positions into the second positions (preferably at the same time) by insertion of a rod below the tips and between said flexible support and said magnetic base in an insertion direction that runs across the longitudinal axes of the elongated holding members (see above), or by means of said rotatable member (see above).

When a plurality of first and second elongated holding members is present, said gap defined between the tips of the first elongated holding members on one side and the tips of the second elongated holding members on the other side preferably extends perpendicular to the longitudinal axes of the elongated holding members (i.e. parallel to the first and second boundary region).

In the first positions of the elongated holding members opposing tips are closer together and said gap is thus smaller than in the second positions in which opposing tips are further apart from each other due to the pivoting of the first elongated holding members away from the second elongated holding members.

It is furthermore possible that the sample holder comprises a temperature, gas and perfusion control system for controlling the temperature of the sample and for providing the sample with a gas and/or liquid (e.g. a buffer solution etc.).

According to a further embodiment of the present invention the tips (e.g. the holding members together with their respective tip) are designed to be moved towards one another (e.g. along a straight line, respectively) so as to actively penetrate the sample (e.g. in addition to the holding mechanism provided by pivoting the holding members/tips), particularly when the tips (and particularly the holding members) are aligned with each other (e.g. along said straight line).

According to a further embodiment, the tips (e.g. the holding members together with their respective tip) are designed to be moved towards one another so as to actively penetrate the sample when the holding members are positioned in their first positions so as to hold the sample.

The sample holder may comprise a means for generating or helping to generate this movement of the tips towards one another.

Particularly, the tips comprise a diameter in the range from 5 micrometer to 200 micrometer, particularly 5 micrometer.

These embodiments, where the tips are moved towards one another so as to actively penetrate the sample from both sides (e.g. as an additional measure to hold the sample) can be combined with any of the other embodiments of the present invention. Of course, these embodiments, where the tips are actively moved towards one another can also use a plurality of holding members and tips as described above.

Further, the problem according to the invention is solved by a system.

According thereto, said system comprises a sample holder according to the invention (e.g. without said rotatable member), wherein said system further comprises a rod being designed to be inserted between said base and the flexible support so as to move the tips from their first positions into their second positions, wherein particularly said rod comprises a tapered and region, wherein particularly said rod is designed for being inserted between said base and said flexible support (e.g. below the tips) with said tapered end region ahead (for allowing easy insertion of said rod between said tape and said base) in an insertion direction running across the longitudinal axes of the elongated members.

Further, the problem underlying the present invention is solved by a method for holding a sample according to claim 18.

The method particularly uses a sample holder according to the invention, wherein the (e.g. elongated) holding members are moved from their first positions into their second positions, particularly by means of a rod comprising a tapered and region, wherein particularly said rod is inserted in an insertion direction with said tapered end region ahead (e.g. below the tips) between a magnetic base and said flexible support resting on said base such that the holding members are moved from their first positions into their second positions, wherein particularly said insertion direction runs across the longitudinal extension directions of the holding members, or particularly by means of said rotatable member (see above), which is rotated in the second position in order to move (e.g. pivot) the holding members into their second positions, and wherein a sample to be held by the device is arranged at least in sections in said gap, and wherein the holding members are moved from their second positions towards their first positions so that the tips penetrate the sample (or at least press against the sample) arranged in said gap and thus fix it to the sample holder, wherein particularly the holding members are moved from their second positions towards their first positions by pulling the rod out of its position between the flexible support and the magnetic base, or particularly by means of the rotatable member, which is rotated into the first position in order to move (e.g. pivot) the holding members into their first positions.

In addition, e.g. in last step, the tips may moved towards one another, e.g. so as to actively penetrate the sample (e.g. from both sides).

In the following embodiments, further features and advantages of the invention shall be described with reference to the Figures, wherein FIG. 1 shows a plan view of an embodiment of a sample holder according to the invention;

Figure 1:
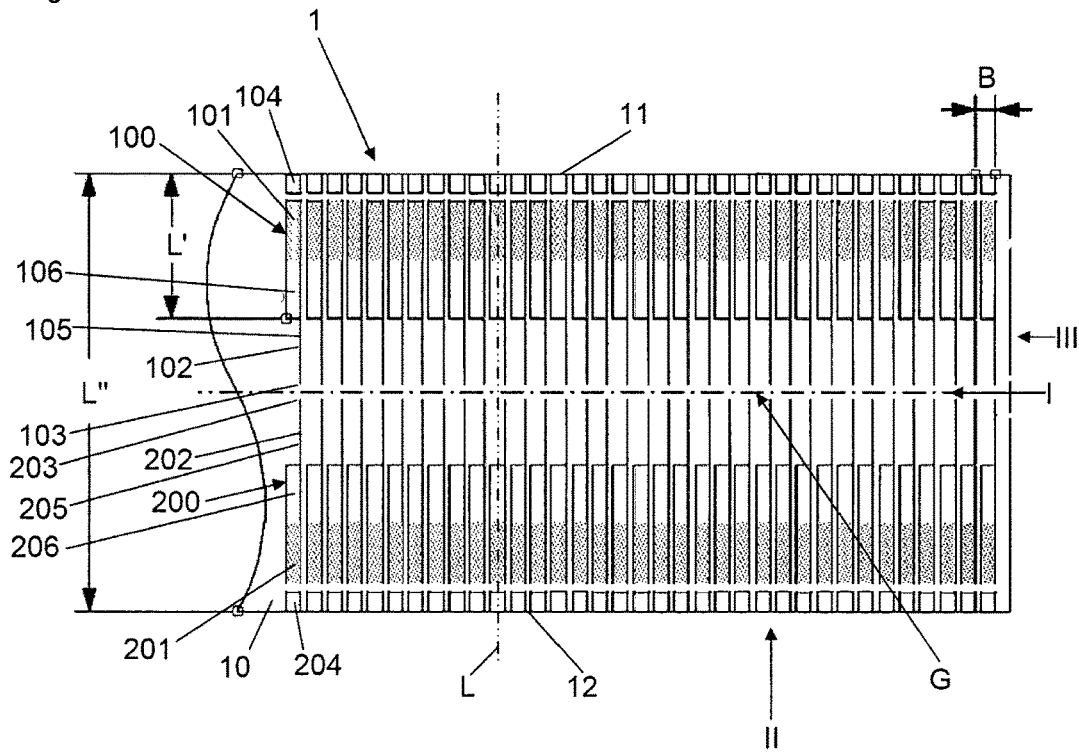
Figure 2:
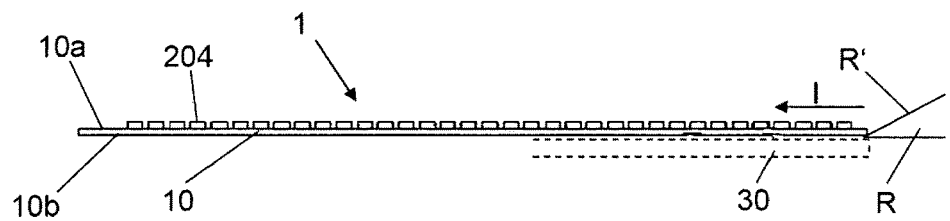
FIG. 2 shows a side view of the sample holder according to FIG. 1 along the direction II indicated in FIG. 1.

According to FIGS. 1 to 4, a sample holder 1 according to the invention comprises a flexible support 10, particularly out of PTFE, in the form of a tape that comprises an upper side 10a and a lower side 10b. The sample holder 1 further comprises a plurality of first and second elongated holding members 100, 200, wherein each of the holding members 100, 200 comprises a first section 101, 201 formed by a metal bar 101, 201 as well as a second section 102, 202 formed by a spike 105, 205 having a tip 103, 203, which spike 105, 205 is attached, particularly glued, to the respective metal bar 101, 201. Each holding member 100, 200, i.e., its first and second section 101, 102, 201, 202, extend along a longitudinal axis L. The holding members 100, 200 are further connected, particularly glued, to the upper side 10a of the flexible support 10 with their first sections (e.g. bars) 101, 201.

Further, the holding members 100, 200 are preferably arranged on the upper side 10a of the flexible support 10 in pairs, such that each first holding member 100 is associated to a second holding member 200, wherein—in a first position—the respectively associated holding members 100, 200 are aligned with respect to each other such that their longitudinal axes L coincide. Further, each first holding member 100 is associated to a first base segment 104 arranged adjacent to the first section 101 of the respective first holding member 100, and each second holding 200 member is associated to a second base segment 204 arranged adjacent to the first section 201 of the respective second holding member 200, wherein—in said first positions—the base segments 104, 204 are also aligned with the respective holding member 100, 200. Preferably, the first base segments 104 are arranged along a first boundary region 11 of the flexible support 10, whereas the second base segments 204 are arranged along an opposing second boundary region 12 of the flexible support 10, which boundary regions 11, 12 extend perpendicular to the longitudinal axes L of the holding members 100, 200. The associated first and second holding members 100, 200 also oppose each other along their longitudinal axes L, and are arranged along these axes L between the two respective base segments 104, 204 associated to the respective pair of holding members 100, 200.

The holding members 100, 200 are further arranged such that a gap G is formed between the tips 103 of the first holding members 100 on one side and the tips 203 of the second holding members 200 on the other side.

Figure 3:
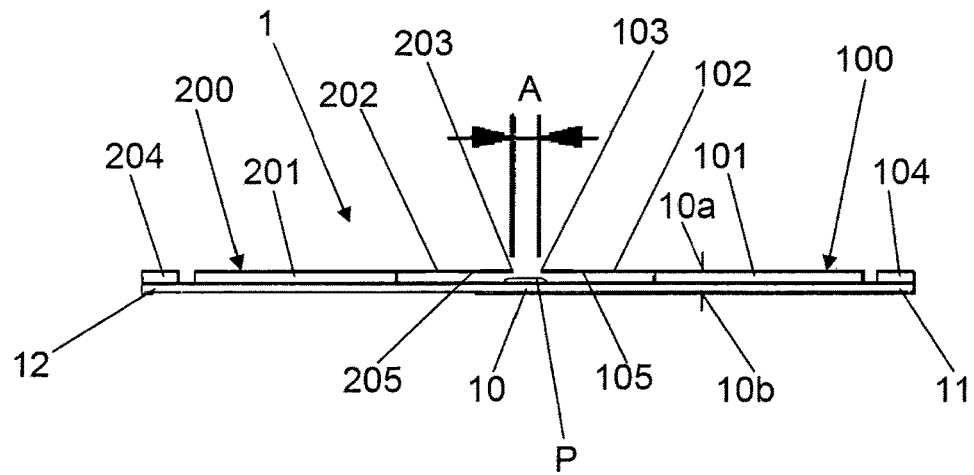
FIG. 3 shows another side view of the sample holder according to FIG. 1 along the direction III indicated in FIG. 1.

Optionally, the center part of the flexible support 10 extending along the gap G comprises a thin porous structure or surface P as indicated in FIG. 3 comprising a plurality of pores. Said surface or structure P is particularly formed by an e.g. metallic or polymer foam or a similar porous structure, wherein these foams or structures are preferably coated with polylysine or fibrin, in order to increase the contact area and adhesion with the sample S. When the holding members 100, 200 reside in their second positions said pores are more open than in the first positions of the holding. Thus the sample S may also be held by one or several pores in the first position of the holding members 100, 200 in addition.

The base segments 104, 204 are also connected, particularly glued, to the upper side 10a of the flexible support, which is preferably made out of PTFE or comprises PTFE, and which rests with its lower side 10b on a magnetic base 30 that attracts the bars 101, 201 of the holding members 100, 200, which are preferably made out of a metal or comprise a metal. The base segments 104, 204 are preferably also made out of a metal or comprise a metal.

Figure 4:
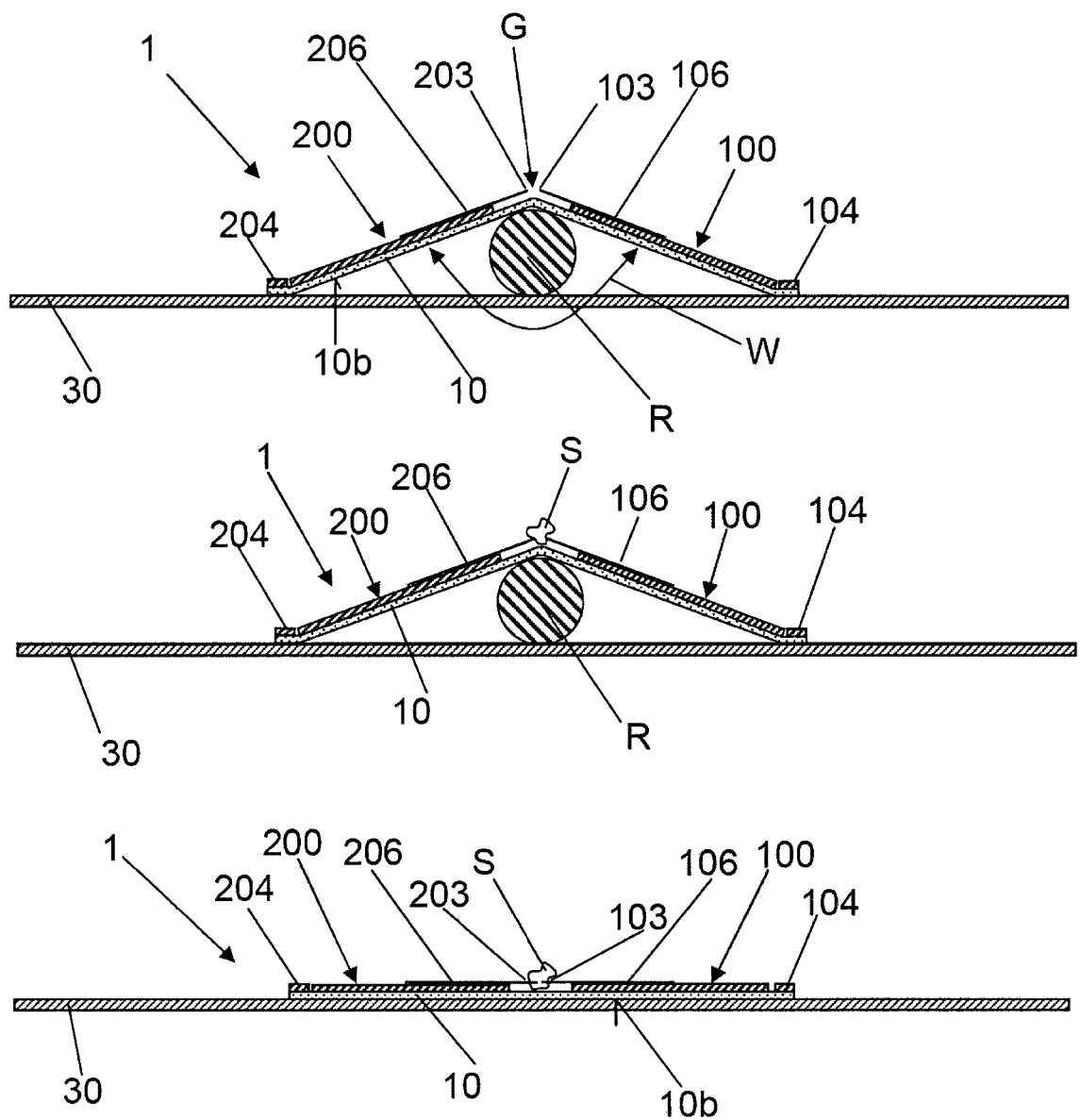
FIG. 4 shows in a sequence of three illustrations how a sample is fixed to the sample holder shown in FIGS. 1 to 3.

Now, in order to fix a sample S to the sample holder 1 as illustrated in FIG. 4, a rod R is inserted below the tips 103, 203 (e.g. below said gap G) between the lower side 10b of the flexible support 10 and the magnetic base 30 along an insertion direction I that extends along the magnetic base 30 or rather along said gap G and perpendicular to the longitudinal axes L of the holding members 100, 200. Preferably, said rod R is inserted between said parts with a tapered end region R' ahead so that the flexible support 10 is successively locally pushed away from the magnetic base 30 such that the bars 101, 201 are lifted from the magnetic base 30 in a pivoting manner together with a portion of the support 10 connected thereto, while the base segments 104, 204 remain attached to the magnetic base 30 attracting them. Hence, the holding members 100, 200 are pivoted away from each other thus enlarging said gap G, while the opposing base segments 104, 204 move towards each other upon that pivoting movements of the holding members 100, 200 induced by the rod R. Once the holding members 100, 200 reside in their second positions in which they are no longer aligned with their respectively associated holding member 100, 200, but arranged at an (e.g. obtuse) angle W with respect to each other that is smaller than 180°, the sample S is at least partially arranged in said gap G, so that upon pulling said rod R out of its position between the support 10 and the magnetic base 30, the holding members 100, 200 pivot back to their first positions, in which the gap G is smaller (i.e. opposing tips 103, 203 are closer together), and thus penetrate the sample S or press against it. This locks the sample S with respect to the sample holder 1.

Particularly, the bars 101, 201 comprise a hydrophobic surface 106, 206, respectively, which particularly provides a heat-stable and water-repellent barrier for maintaining the locked sample S immersed within the respective buffer (e.g. an aqueous solution like PBS, Ringer etc.). Particularly, said surfaces 106, 206 are provided by coating the upper halves of the bars 101, 201 with a PAP-Pen marker (e.g. Research Products International, Mt. Prospect, Ill.). Further, also PTFE or other hydrophic polymers can be used for coating.

Preferably, the spikes 105, 205 are 0.8 mm in diameter and the portion of the respective spike 105, 205 that protrudes from the respective bar 101, 201 is preferably 4.5 mm long (with respect to the respective longitudinal axis L) with a sharpened end forming the respective tip 103, 203. They are preferably attached with Epoxy glue at the end of the metal bars 101, 201 with respect to their longitudinal axes L.

Preferably, the distance A between the tips 103, 203 (i.e. width of the gap G) in said first positions of the holding members 100, 200 is A=1 mm.

Further, the length L' of the bars 101, 201 including the respectively associated base segment 104, 204 (plus distance between base segment 104, 204 and bar 101, 201) is preferably 10 mm, while the overall width L" of the flexible support 10 along the longitudinal axes L is preferably 30 mm.

Further, the width B of the bars 101, 201 across the longitudinal axes L preferably is 5=1.4 mm including the distance to the next bar 101, 201.

FIGS. 5 to 8 show a further embodiment of a sample holder 1 according to the invention.

Here, again, the sample holder 1 comprises a flexible support 10 (cf. FIG. 6), e.g. as described above, wherein first elongated holding members 100 are arranged on an upper side 10a of the flexible support 10 along a first boundary region 11 of the flexible support 10, namely parallel to each other and equidistantly spaced apart from each other, wherein their longitudinal axes L extend perpendicular to said first boundary region 11. Further, each first elongated member 100 comprises an end 14 that preferably protrudes from the flexible support 10 beyond said first boundary region 11, wherein these ends 14 may be broadened with respect to the remaining shaft of the respective elongated holding member 100.

Likewise, the second elongated holding members 200 are arranged along a second boundary region 12 of the flexible support 10, which second boundary region 12 runs parallel to said first boundary region 11 and opposes said first boundary region 11. Also, the second holding members 200 extend parallel to each other and are equidistantly spaced apart from each other, wherein their longitudinal axes L extend perpendicular to said second boundary region 12. Further, each second elongated member 200 comprises an end 24 that preferably protrudes from the flexible support 10 beyond said second boundary region 12, wherein these ends 24 may be broadened with respect to the remaining shaft of the respective elongated holding member 200.

The first and the second holding members 100, 200 each comprise a first section 101, 201 comprising said protruding ends 14, 24 as well as second section 102, 202 connected to the respective first section 101, 201, which forms a tip 103, 203, respectively, for penetrating (or pressing against) a sample S to be held by the sample holder 1, wherein the first sections 101, 201 of the holding members 100, 200 are fastened or glued to the upper side 10a of the flexible support 10 (see also above).

Figure 6:
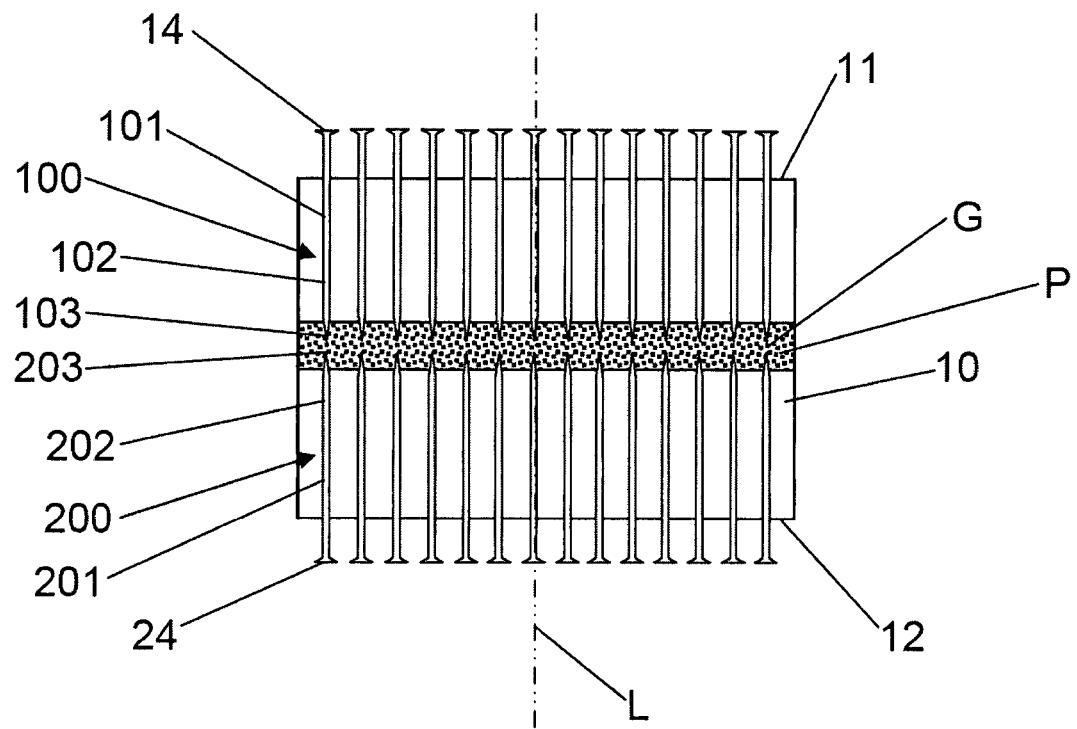
FIG. 6 shows a top view of a flexible support with elongated holding members of the sample holder according to FIG. 5.
Figure 8:
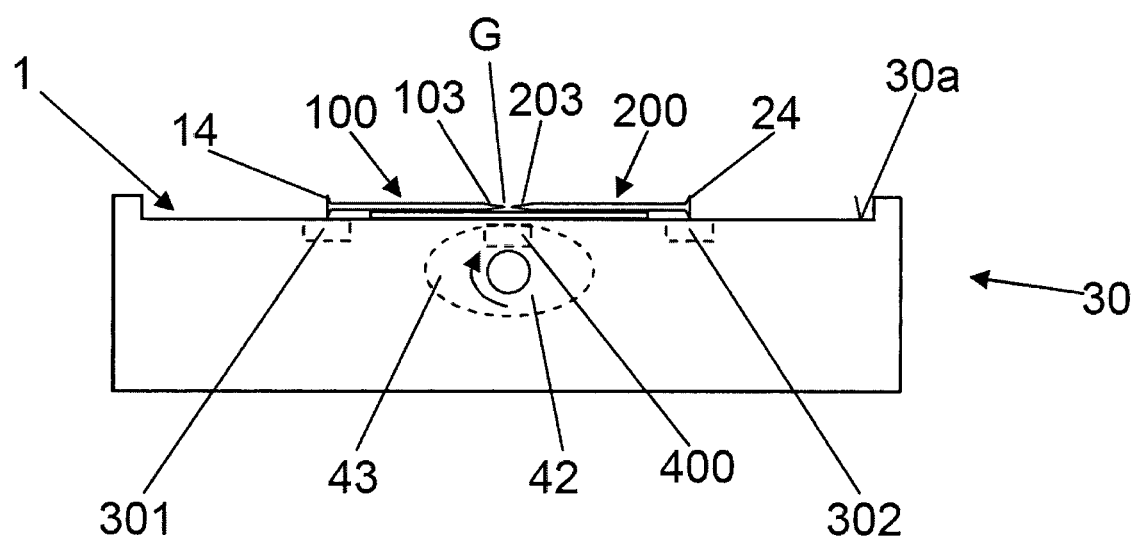
FIG. 8 shows in a sequence of two side views how a sample is fixed to the sample holder of FIGS. 5 to 7.
Figure 8:
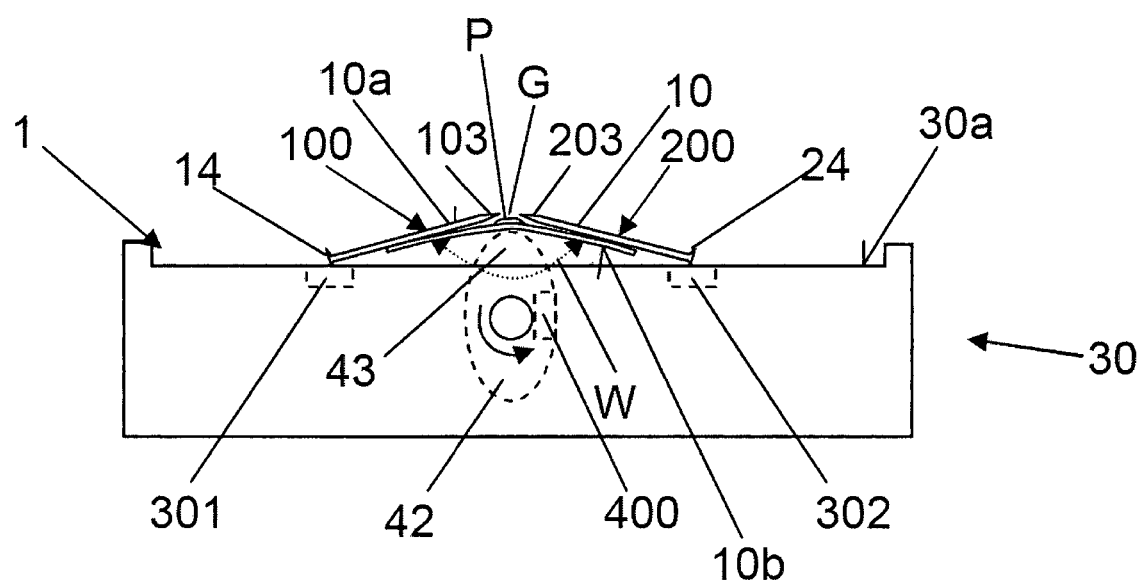

Each first holding member 100 is associated to a different second holding member 200, wherein each first and its associated second holding member 100, 200 fall in line with respect to their longitudinal axes L in a first position of the holding members shown in FIGS. 6 and 8 (upper part). As in the embodiment described above with respect to FIGS. 1 to 4, the opposing tips 103, 203 of the holding members 100, 200 delimit a gap G for receiving the sample S to be held.

Again, optionally, a porous surface P as described above may be present on the upper surface of the flexible support 10 below the gap G.

Figure 7:
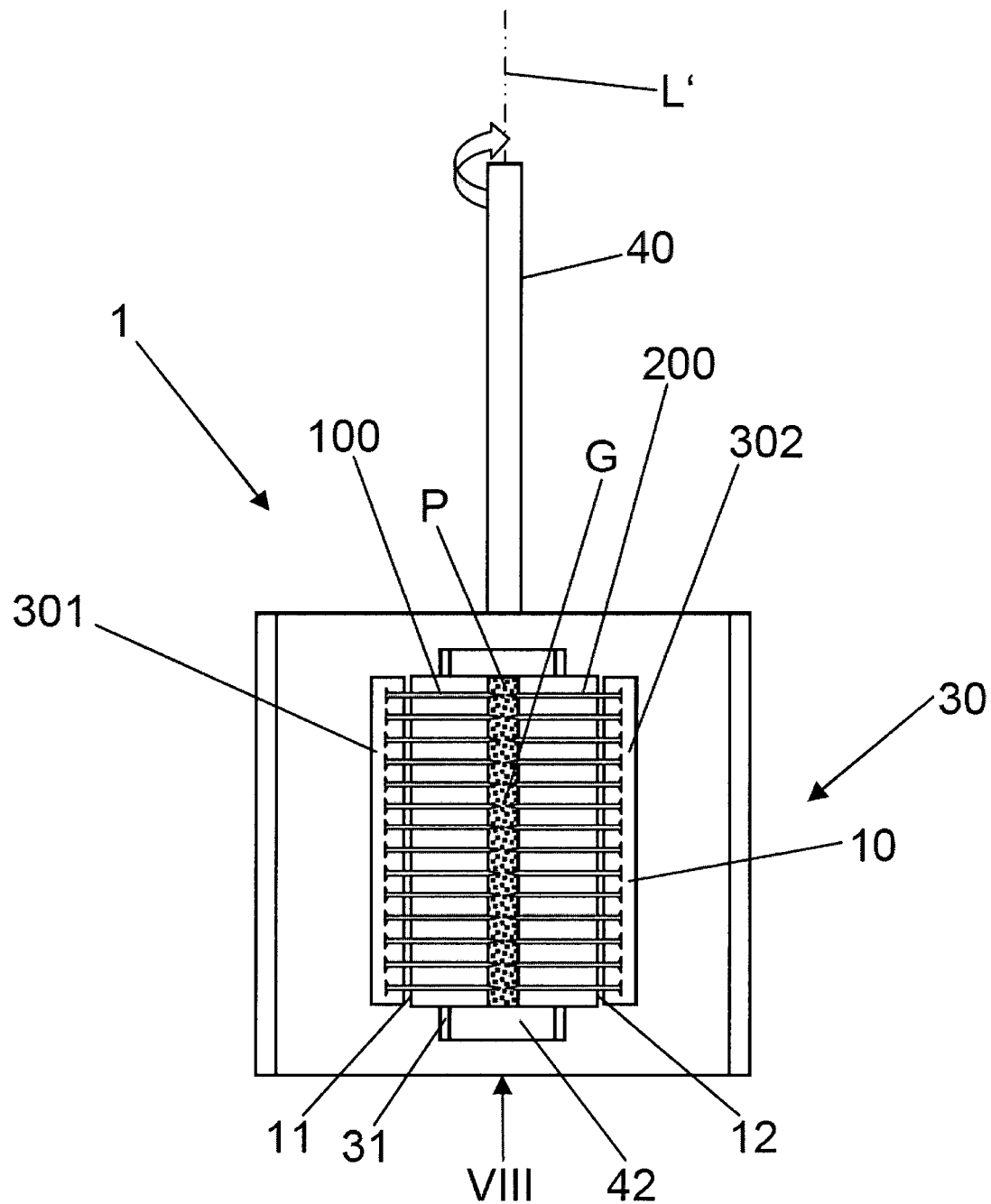
FIG. 7 shows a top view of the complete sample holder with base according to FIG. 5 and flexible support as well as elongated holding members according to FIG. 6.

As shown in FIG. 7, the flexible support 10 is designed to rest with a lower side 10b facing away from said upper side 10a on an upper side 30a of a base 30, wherein the base 30 comprises two magnetic regions 301, 302 in the form of a first holding magnet 301 and a second holding magnet 302 which are both integrated into the base 30 so that they are essentially flush with the upper side 30a of the base 30. Said magnets 301, 302 are arranged such that the ends 14 of the first holding members 100 contact the first magnet 301 and are attracted by them (the first and second holding members 100, 200 are preferably formed out of a metal), and the ends 24 of the second holding members 200 contact the second magnet 302 and are attracted by them, wherein the second magnet 302 opposes the first magnet 301. Further, the two magnets 301, 302 extend perpendicular to the longitudinal axes L of the holding members 100, 200, i.e. along the respective boundary region 11, 12 of the flexible support 10 when the flexible support 10 rests on the upper side 30a of the base 30 as intended (cf. FIG. 7).

As shown in FIGS. 7 and 8, the base 30 further comprises a rotatable member 42 by means of which the holding members 100, 200 can be pivoted from their first positions shown in FIG. 8 (upper part) into their second positions (cf. FIG. 8 lower part) in which the holding members 100, 200 are arranged at an (e.g. obtuse) angle with respect to each other that is smaller than 180° (cf. FIG. 4 as an example), so that the gap G opens and allows one to arranged a sample S (as shown in FIG. 4) in the gap. Now, when the holding members 100, 200 are returned to their first positions said sample S is penetrated (or pressed) from both sides by tips 103, 203 and thus fixed to the sample holder 1 as shown in FIG. 4.

Said rotatable member 42 is designed to be rotated between a first position or retracted position (upper part of FIG. 8) and a second position or advanced position (lower part of FIG. 8), wherein the rotatable member 42 protrudes with a portion 43 from the upper side 30a of the base 30 along a normal of said upper side 30a when rotated into its second position and thereby pushes with said portion 43 against the lower side 10b of the flexible support 10 facing away from said upper side 10a of the flexible support 10 such that the holding members 100, 200 are arranged in their second positions. Further, the rotatable member 42 is retracted, i.e. does not protrude from the upper side 30a of the base 30 when rotated into its first position such that the holding members 100, 200 are arranged in their first positions. Said rotatable member 42 may be arranged in a recess 31 of the base 30, wherein the rotatable member 42 may comprise a handle 40 for (e.g. manually) rotating the rotatable member 42 between said first and second position, which handle 40 protrudes from the rotatable member 42 along a rotation axis L' of the rotatable member 42 about which the rotatable member 42 is rotatably mounted to the base 30.

For actually pushing a portion of the flexible support 10 and therewith the holding members 100, 200 out of their first positions into their second positions, the rotatable member 42 comprises a cross-sectional contour in a plane extending perpendicular to the rotation axis L' that comprises a longer and a shorter axis (e.g. an ellipsoidal contour), so that the rotatable member 42 forms a portion 43 (e.g. along said longer axis) that protrudes from said upper side 30a of the base 30 when the rotatable member 42 is rotated into its second position (cf. FIG. 8 lower part), while the rotatable member 42 is preferably completely arranged in the recess 31 in the first (retracted) position (cf. FIG. 8 upper part).

When rotating the rotatable member 42 from the first position into the second position, said portion 43 starts protruding out of the recess 31 beyond the upper surface 30a of the base 30 and pushes against a portion of the lower side 10b of flexible support 10 below said tips 103, 203 so that a portion of the flexible support 10 as well as the holding members 100, 200 are taken along and are pivoted out of their first positions into their second positions. At the same time said ends 14, 24 of the holding members 100, 200 are attracted by the base 30, i.e. by the respective magnet 301, 302, so that said ends 14, 24 remain in contact with the base 30 (e.g. magnets 301, 302) when the holding members 100, 200 are pivoted from their first positions into their second positions.

Furthermore, the rotatable member 42 comprises a third magnetic portion 400, e.g. in the form of a third magnet 400, which faces said tips 103, 203 in the first position of the rotatable member 42, so as to attract the tips 103, 203 of at least some of the holding members 100, 200 when the rotatable member 42 and the holding members 100, 200 reside in their respective first position. When rotating the rotatable member 42 in its second position said third magnet 400 is rotated away from the tips 103, 203, so that the attraction of the tips 103, 203 by the third magnet 400 becomes considerably weaker.

Further, when the porous surface P is present, as indicated in FIG. 8, it may provide for an additional holding effect due to its pores as described above, which pores are more open due to a deformation/bending of the surface P—in the second positions of the holding members 100, 200 than in their first positions, so that the pores may catch the sample S (i.e. hold parts of the sample S in the pores) in the first positions of the holding members.

Further, the holding members 100, 200 according to FIG. 6 may also be coated with a hydrophobic surface as described above.

Figure 9:
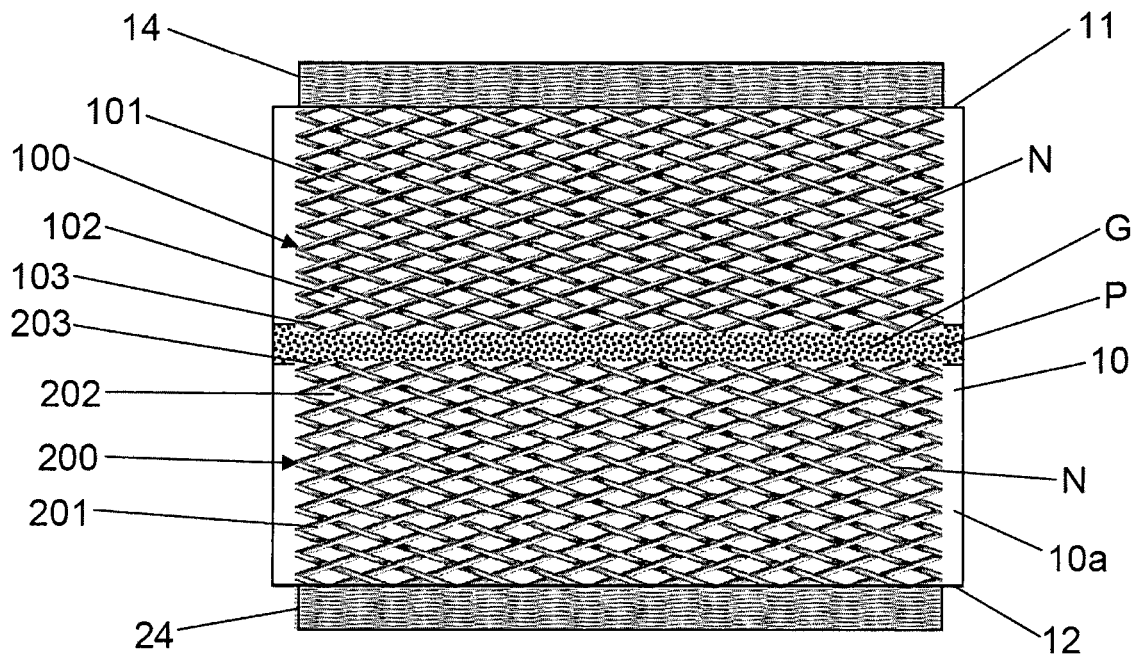
FIG. 9 shows a further embodiment of the holding members.

FIG. 9 shows yet another embodiment of the holding members 100, 200, which are attached again to a flexible support 10, e.g. as described above, wherein a first holding member 100 comprising a net element N is arranged on an upper side 10a of the flexible support 10 along a first boundary region 11 of the flexible support 10. Further, each first holding member 100 comprises an end region 14 that preferably protrudes from the flexible support 10 beyond said first boundary region 11.

Likewise, a second holding member 200 is arranged along a second boundary region 12 of the flexible support 10 on said upper side 10a, which second boundary region 12 runs parallel to said first boundary region 11 and opposes said first boundary region 11. Also, the second holding member 200 comprises a net element N. Further, each second holding member 200 comprises an end region 24 that preferably protrudes from the flexible support 10 beyond said second boundary region 12.

The first and the second holding member 100, 200 each comprise a first section 101, 201 comprising said (e.g. protruding) end regions 14, 24 as well as portion of the respective net element N, and a second section 102, 202 connected to the respective first section 101, 201, which second section 102, 202 comprises the remaining portion of the respective net element N forming a plurality of tips 103, 203, respectively, for penetrating (or pressing against) a sample S to be held by the sample holder 1. The first sections 101, 201 of the holding members 100, 200 are fastened or glued to the upper side 10a of the flexible support 10 (see also above).

As in the embodiments described above with respect to FIGS. 1 to 4 and 5 to 8, the opposing tips 103, 203 of the holding members 100, 200 delimit a gap G for receiving the sample S to be held.

Again, optionally, in FIG. 9, a porous surface P as described above may be present on the upper surface 10a of the flexible support 10 below the gap G providing for an additional holding effect as described above with respect to FIG. 8.

Figure 5:
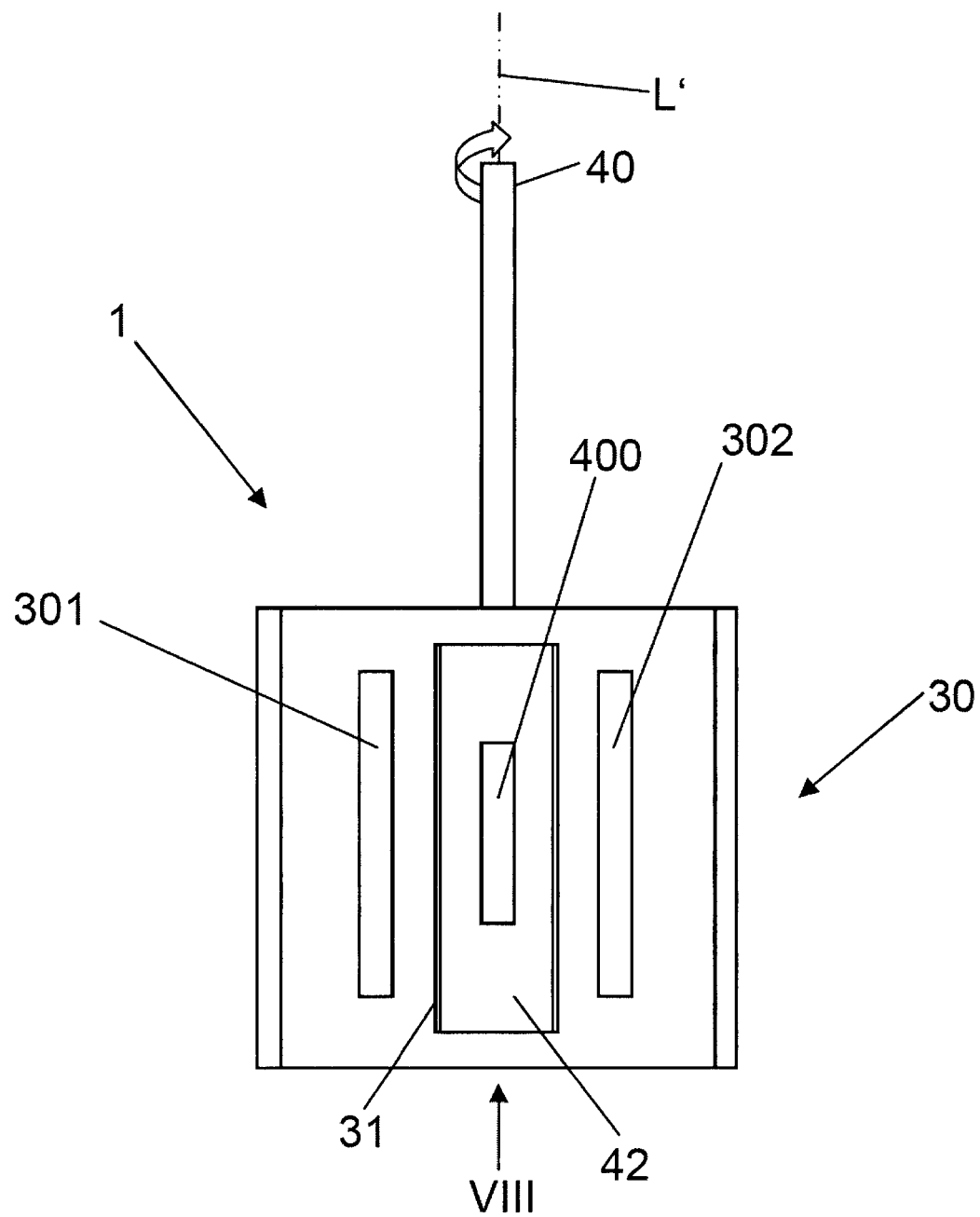
FIG. 5 shows a top view onto a base of a further embodiment of a sample holder according to the invention.

The flexible support 10 with holding members 100, 200 according to FIG. 9 can be used with the base shown in FIG. 5 instead of the flexible support according to FIG. 6. Then, the end regions 14, 24 rest on the magnets 301, 302. Further, the surface P (when comprising a suitable metal) may be attracted by the third magnetic portion or magnet 400 in the first positions of the holding members 100, 200.

However, the flexible support 10 with holding members 100, 200 according to FIG. 9 can also be employed in the embodiment according to FIGS. 1 to 4.

Further, the holding members 100, 200 according to FIG. 9 may also be coated with a hydrophobic surface as described above.

Figure 10:
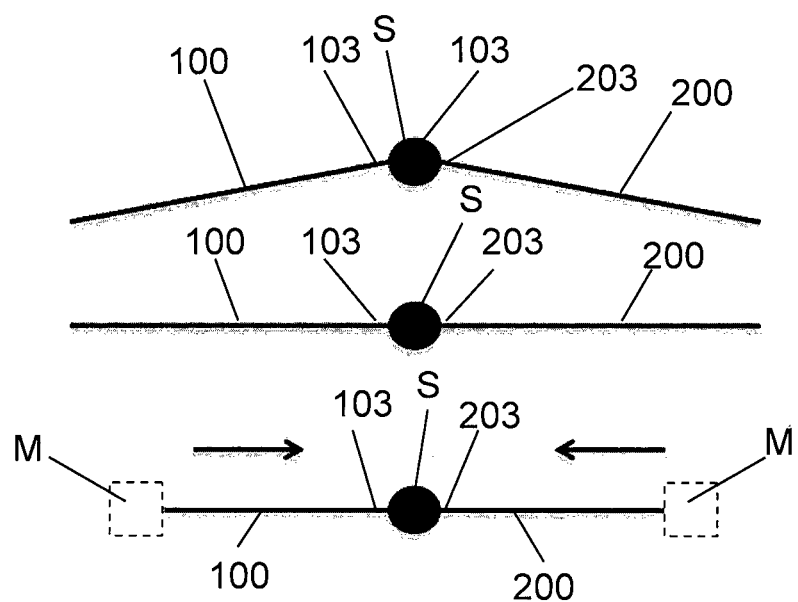
FIG. 10 shows a schematic view of a further embodiment of the present invention.

Finally, FIG. 10 shows a further feature of the present invention, which can be combined with all embodiments described above. Here, e.g. in a last step, the tips 103, 203 and particularly their holding members 100, 200 are moved towards one another so as to actively penetrate the sample S. Particularly, this movement is carried out after the tips 103, 203 and particularly the holding members 100, 200 have been moved back to their first positions, as shown in the upper two drawings of FIG. 10. The sample holder may comprise a means M for generating said movement of the tips 103, 203 towards one another. The movement of the tips 103, 203 towards one another may also be generated manually.

REFERENCES

1. Loparic, M., et al., Micro- and nanomechanical analysis of articular cartilage by indentation-type atomic force microscopy: validation with a gel-microfiber composite. Biophys J, 2010. 98(11): p. 2731-40.
2. Ivkovic, A., et al., Articular cartilage repair by genetically modified bone marrow aspirate in sheep. Gene Ther, 2010. 17(6): p. 779-89.
3. Plodinec, M., M. Loparic, and U. Aebi, Atomic force microscopy for biological imaging and mechanical testing across length scales. Cold Spring Harb Protoc, 2010. 2010(10): p. pdb top86.
4. Guilak, F., et al., Spatial Mapping of the Biomechanical Properties of the Pericellular Matrix of Articular Cartilage Measured In Situ via Atomic Force Microscopy. Biophysical Journal, 2010. 98(12): p. 2848-2856.
5. Stolz, M., et al., Early detection of aging cartilage and osteoarthritis in mice and patient samples using atomic force microscopy. Nat Nanotechnol, 2009. 4(3): p. 186-92.

The invention claimed is:

1. Sample holder for holding a sample for use with an atomic force microscope, wherein the sample holder comprises:
    a first and a second holding member (100, 200), wherein each holding member (100, 200) comprises tips (103, 203), wherein the holding members (100, 200) are each movable from a first position, in which the tips (103) of the first holding member (100) are positioned adjacent the tips (203) of the second holding member (200), into a second position, in which the tips of the first holding member (103) are further apart from the tips (203) of the second holding member (200) than in said first positions and are separated by a gap (G) for receiving at least a portion of the sample (S) to be held, and wherein said tips (103, 203) are designed to penetrate opposing lateral surfaces or to press against opposing lateral surfaces of the sample (S) so as to hold it when the sample (S) is received by said gap (G) and the holding members (100, 200) are moved back from the second positions into the first positions, wherein each holding member (100, 200) is formed by a net element (N) comprising a plurality of crossed elongated members and extending two-dimensionally along a plane of extension and forming said tips (103, 203) of the respective holding member (100, 200), wherein each tip comprises a diameter in the range from 5 micrometer to 200 micrometer, and wherein said movement from the first positions into the second positions comprises a pivoting movement of the holding members (100, 200) in a plane running perpendicular to the plane of extensions of the net elements (N) upon which the tips (103) of the first holding member (100) move away from the tips (203) of the second holding member (200), a flexible support (10) comprising, PTFE extending below the gap (G), wherein the flexible support (10) comprises an upper side (10a) and a lower side (10b) facing away from said upper side (10a), wherein each holding member (100, 200) comprises a first section (101, 201) that is connected to the upper side (10a) of the flexible support (10), as well as a second section (102, 202) forming said tips (103, 203), and wherein the flexible support (10) comprises a porous surface (P) on the upper side (10a) having a plurality of pores, which porous surface (P) extends below the gap (G), wherein when the holding members reside in their second positions said pores are open, and once the holding members are moved to the first positions, said pores close, so that the sample is retained by the pores.

2. Sample holder according to claim 1, characterized in that said movement from the first positions into the second positions is a pivoting movement of the holding members (100, 200) upon which the tips (103, 203) move away from each other.

3. Sample holder according to claim 1, characterized in that the sample holder comprises a base (30), wherein said flexible support (10) is designed to rest with its lower side (10b) on an upper side (30a) of said base (30).

4. Sample holder according to claim 1, characterized in that the holding members (100, 200) each comprise a hydrophobic surface (106, 206).

5. Sample holder according to claim 1, characterized in that the flexible support (10) comprises a porous surface (P) having a plurality of pores, which surface (P) extends below the gap (G) between said tips (103, 203).

6. Sample holder according to claim 1, characterized in that said net elements (N) are formed out of plastic or a metal.

7. Sample holder according to claim 3, characterized in that the sample holder (1) further comprises a separate first base segment (104), which is connected to the upper side (10a) of the flexible support (10) adjacent to said first section (101) of the first holding member (100) and attracted by the base (30), so that the first holding member (100) can be pivoted out of its first position into its second position, wherein the first holding member (100) is released from the base (30), while the first base segment (104) remains attached to the base (30), and wherein the sample holder (1) further comprises a separate second base segment (204), which is connected to the upper side (10a) of the flexible support (10) adjacent to said first section (201) of the second holding member (200) and attracted by the base (30), so that the second holding member (200) can be pivoted out of its first position into its second position, wherein the second holding member (200) is released from the base (30), while the second base segment (204) remains attached to the base (30).

8. Sample holder according to claim 7, characterized in that the first base segment (104) is arranged on a first boundary region (11) of the flexible support (10), and wherein the second base segment (204) is arranged on a second boundary region (12) of the flexible support (10), which second boundary region (12) opposes said first boundary region (11).

9. Sample holder according to claim 1, characterized in that the holding members (100, 200) are designed to be moved from the first positions into the second positions by insertion of a rod (R) between said flexible support (10) and said base (30) in an insertion direction (I) that runs across longitudinal axes (L) of the holding members (100, 200).

10. Sample holder according to claim 1, characterized in that each holding member (100, 200) comprises a bar (101, 201), which bar forms said first section (101, 201), and wherein each holding member (100, 200) further comprises a spike (105, 205) connected to the respective bar (101, 201), which spike (105, 205) comprises the respective second section (102, 202) forming the respective tip (103, 203).

11. Sample holder according to claim 3, characterized in that the base (30) comprises a rotatable member (42) that is designed to be rotated between a first position and a second position, wherein the rotatable member (42) protrudes with a portion (43) from the upper side (30a) of the base (30) when rotated into its second position and thereby pushes with said portion (43) against a lower side (10b) of the flexible support (10) facing away from said upper side (10a) of the flexible support (10) such that the holding members (100, 200) are arranged in their second positions when the rotatable member (42) has been rotated into its second position, and wherein the rotatable member (42) is retracted when rotated into its first position such that the holding members (100, 200) are arranged in their first positions.

12. Sample holder according to claim 11, characterized in that that each holding member (100, 200) comprises an end (14, 24) opposing the tip (103, 203) of the holding member (100, 200), wherein said base (30) is designed to act with a magnetic force on each end (14, 24), so that said ends (14, 24) are attracted by the base (30), so that said ends (14, 24) remain in contact with the base (30) when the holding members (100, 200) are moved from their first positions into their second positions.

13. Sample holder according to claim 11, characterized in that said rotatable member (42) comprises a magnetic portion (400) which faces said tips (103, 203) in the first position of the rotatable member (42), so as to attract the tips (103, 203) of the holding members (100, 200) when the rotatable member (42) and the holding members (100, 200) reside in their first positions.

14. Sample holder according to claim 1, characterized in that the tips (103, 203) are designed to be moved towards one another so as to actively penetrate the sample (S).

15. Sample holder according to claim 1, characterized in that when the holding members are positioned in their first positions so as to hold the sample, the tips are designed to be moved towards one another so as to actively penetrate the sample (S).

16. Method for holding a sample using a sample holder according to claim 1, wherein a sample to be held by the sample holder is arranged at least in sections in said gap, and wherein the holding members are moved from their second position towards their first position so that the tips penetrate the sample or at least press against the sample arranged in said gap and thus fix the sample to the sample holder.

17. Sample holder according to claim 3, wherein the base (30) is designed to act with a magnetic force on each holding member (100, 200), so that the base attracts the holding members (100, 200).

18. Sample holder for holding a sample, wherein the sample holder comprises a first and a second holding member (100, 200), wherein each holding member (100, 200) comprises a tip (103, 203), wherein the holding members (100, 200) are each movable from a first position, in which the tips (103, 203) are positioned adjacent to one another, into a second position, in which the tips (103, 203) are further apart from each other than in said first positions and are separated by a gap (G) for receiving at least a portion of the sample (S) to be held, and wherein
   said tips (103, 203) are designed to penetrate opposing lateral surfaces or to press against opposing lateral surfaces of the sample (S) so as to hold it when the sample (S) is received by said gap (G) and the holding members (100, 200) are moved back from the second positions into the first positions, wherein said movement from the first positions into the second positions comprises a pivoting movement of the holding members (100, 200) in a vertical plane upon which the tips (103, 203) move away from each other, and wherein the sample holder comprises a base (30), wherein said flexible support (10) is designed to rest with its lower side (10b) on an upper side (30a) of said base (30), and wherein the sample holder (1) further comprises a separate first base segment (104), which is connected to the upper side (10a) of the flexible support (10) adjacent to said first section (101) of the first holding member (100) and attracted by the base (30), so that the first holding member (100) can be pivoted out of its first position into its second position, wherein the first holding member (100) is released from the base (30), while the first base segment (104) remains attached to the base (30), and wherein the sample holder (1) further comprises a separate second base segment (204), which is connected to the upper side (10a) of the flexible support (10) adjacent to said first section (201) of the second holding member (200) and attracted by the base (30), so that the second holding member (200) can be pivoted out of its first position into its second position, wherein the second holding member (200) is released from the base (30), while the second base segment (204) remains attached to the base (30).

\* \* \* \* \*